(12) United States Patent
Roosen

(10) Patent No.: US 10,457,843 B2
(45) Date of Patent: Oct. 29, 2019

(54) MAGNETIC FLOORING SYSTEM ADHESIVE COMPOSITION

(71) Applicant: !OBAC Ltd, Guernsey (GB)

(72) Inventor: Peter Roosen, Apache Junction, AZ (US)

(73) Assignee: !OBAC Ltd, Guernsey (GB)

( * ) Notice: Subject to any disclaimer, the term of this patent is extended or adjusted under 35 U.S.C. 154(b) by 155 days.

(21) Appl. No.: 15/681,168

(22) Filed: Aug. 18, 2017

(65) Prior Publication Data
US 2019/0055440 A1 Feb. 21, 2019

(51) Int. Cl.
| | |
|---|---|
| C08K 5/00 | (2006.01) |
| C09J 175/04 | (2006.01) |
| C08K 5/05 | (2006.01) |
| C08G 18/38 | (2006.01) |
| C08J 9/228 | (2006.01) |
| E04F 15/02 | (2006.01) |
| H01F 1/147 | (2006.01) |
| H01F 1/22 | (2006.01) |

(52) U.S. Cl.
CPC ........ *C09J 175/04* (2013.01); *C08G 18/3817* (2013.01); *C08G 18/3831* (2013.01); *C08J 9/228* (2013.01); *C08K 5/05* (2013.01); *E04F 15/02144* (2013.01); *H01F 1/14766* (2013.01); *H01F 1/22* (2013.01); *C08K 2201/01* (2013.01); *C09J 2491/006* (2013.01)

(58) Field of Classification Search
CPC .. C08K 5/05; C08K 5/00; C08J 175/04; C08J 9/228; C08G 18/3817; C08G 18/3831
USPC ........................................................ 524/435
See application file for complete search history.

(56) References Cited

U.S. PATENT DOCUMENTS

| | | |
|---|---|---|
| 3,691,940 A | 9/1972 | Hays et al. |
| 3,714,127 A | 1/1973 | Fabris et al. |
| 3,812,003 A | 5/1974 | Larson et al. |
| 3,886,122 A | 5/1975 | Fabris et al. |
| 3,935,051 A | 1/1976 | Bender et al. |
| 4,145,514 A | 3/1979 | deVry et al. |
| 4,444,976 A | 4/1984 | Rabito |
| 4,803,257 A | 2/1989 | Goel |
| 4,994,322 A | 2/1991 | Delgado et al. |
| 5,194,299 A | 3/1993 | Fry |
| 5,502,108 A | 3/1996 | Silver et al. |
| 5,810,956 A | 8/1998 | Tanis et al. |
| 8,656,682 B2 | 2/2014 | Williamson et al. |
| 2005/0249912 A1* | 11/2005 | Randall ................ B29C 44/022 428/95 |
| 2010/0285268 A1 | 11/2010 | Chen |
| 2013/0075649 A1 | 3/2013 | Wang |
| 2015/0140341 A1 | 5/2015 | Robinson et al. |

OTHER PUBLICATIONS

Narasinham, K.S. et al., "Effect of Particle Size and 2P2C Technology on the Soft Magnetic Properties of Composite Iron Compacts", undated. 7 pages.

* cited by examiner

Primary Examiner — Hannah J Pak
(74) Attorney, Agent, or Firm — Jospeh E. Maenner; Maenner & Associates, LLC

(57) ABSTRACT

A liquid adhesive coating composition that cures into a solid form, used to non-permanently adhere interior floor or wall coverings to substrate floor or wall surfaces respectively, includes a polymer incorporating iron or other paramagnetic, superparamagnetic, ferromagnetic, or ferrimagnetic ingredients, that becomes permanently adhered to the substrate as it cures, and thereafter provides a low-tack adhesive surface that is also magnetically attractive, upon which magnetized floor or wall coverings including certain types of carpet, linoleum, vinyl, wallpaper, and other types of magnetically-backed coverings can be subsequently installed. The combined low-tack adhesive and magnetic adhesion qualities of the cured composition of the invention allow for the magnetically-backed floor or wall coverings to be sufficiently well adhered to the surface of the cured adhesive composition to remain in place during normal usage while retaining the ability for the coverings to be subsequently removed, repositioned or replaced without damaging the respective coverings, adhesive coating composition layer, or substrate.

22 Claims, No Drawings

MAGNETIC FLOORING SYSTEM ADHESIVE COMPOSITION

FIELD OF THE INVENTION

The present invention relates to magnets and adhesive coating compositions used to adhere interior floor and wall coverings to substrate surfaces, particularly flexible coverings provided with magnetic backing that normally come in the form of tiles or rolls such as certain kinds of linoleum, vinyl, carpet and wallpaper.

BACKGROUND OF THE INVENTION

Modern interior rigid floor coverings evolved from slate, stone, ceramic, clay and other types of tiles, loosely or tightly placed, or grouted, onto dirt or clay substrates, or placed onto or adhered to wood or cementitious substrates using cementitious liquids and pastes that dry or otherwise cure into solid form. These early types of rigid flooring are still commonly used. Modern flooring adhesives still include these above types but there has generally been a shift toward using polymers, either alone or in combination with cementitious materials, to adhere rigid floor coverings to the respective substrate floor. Rigid composite laminate flooring systems have also become quite popular in recent years and are a modern example of tightly placed interlocking pieces that are not normally bound to the substrate floor with adhesives.

The various types of rigid floor coverings remain important but less so than in earlier times. Flexible floor coverings now form a large part of the flooring market. Rigid wall coverings evolved similarly to floor coverings, with ceramic tiles often used in kitchens and bathrooms being a common modern example of a rigid wall covering system.

Early interior flexible floor coverings that could be rolled or bent includes animal skins, mats or carpets made from vegetation, animal hair such as wool, and other textiles, fibrous materials and fabrics that are made into various woven and non-woven types. There is a wide range of carpet types and styles that have evolved along different paths in various parts of the world. Carpets, linoleum, vinyl and flexible laminate flooring, now often made from synthetic polymers, have evolved from the earlier types.

Interior flexible floor coverings are loosely placed or adhered to substrates using tacks, nails, screws and/or other types of mechanical fasteners. They are also able to be adhered to substrates using liquid or paste adhesives that dry or otherwise cure into rigid or flexible (elastomeric) binding layers, with or without using mechanical fasteners. Cementitious liquids and pastes are generally not used to adhere flexible floor coverings to their respective substrates. Presently, flexible floor coverings that employ adhesives comprise non-cementitious adhesive polymers, often in combination with mechanical fasteners. In the case of carpeting and some other flooring types, various underlays such as flexible foam sheets can be and are often sandwiched between the carpet and substrate floor.

Many of the flexible floor coverings described above can also be used as wall coverings. However, the most common type of interior wall covering is paint, with wallpaper also being a very important type. The wall substrates in present use comprise stone, brick, concrete, concrete masonry blocks and wooden boards and panels as well as plaster among earlier types although modern interior wall systems are largely built using gypsum wallboards that have the joints made smooth and ready to accept one or more coats of paint, wallpaper or other type of covering. Various types of paints, varnishes and other finishes are applied as a liquid with brushes, rollers or sprayers, then dry or otherwise cure into a solid finished coating. Wallpapers are normally adhered using non-cementitious liquid adhesives that similarly dry or cure into a solid form. Wallpapers are often installed using starch-based adhesives. Vinyl peel-and-stick wallpapers are available but are less common than conventional wallpapers that require a separate adhesive layer.

For interior floors and walls, flexible coverings were and are still often used on top of either rigid or flexible coverings. For example, a bearskin can be hung on a painted wall or loosely laid on top of a mat or carpet that, in an example of further layering, has said mat or carpet installed on a stone tile floor where the stone tiles have been grouted and adhered to a wood or concrete floor substrate using a cementitious compound.

Flexible coverings are typically delivered and installed from rolls, packages of flat strips or bundles or boxes of tiles.

Paints and other types of coating compounds that are applied as a liquid and dry or cure into solid form and become permanently adhered to wall substrates are also used on floor substrates, albeit not as commonly as they are used on walls. In the case of flooring, the most common cases where floors are painted or coated using a liquid application are in commercial and industrial flooring sectors, usually on concrete or steel floor substrates. Ship floors, usually referred to as decks, are normally covered in this manner.

It is quite evident from this above description that there is often a desire to have floor or wall coverings, except in the case of paint where it is usually relatively easily recoated without needing to remove the earlier paint covering, not be permanently adhered to the respective floor or wall substrates. This is especially preferred in the case of many flexible covering applications. The desire for non-permanent adhesion is less common for rigid flooring types although there are people who would prefer to be able to change rigid floor tiles to replace damaged ones or change the style from time to time without needing to engage in difficult and costly removal and replacement procedures that usually damages or destroys the covering being removed, adhesive layer and/or substrate.

Floor and wall adhesives are normally considered to be permanent which means that they are only used once to fix a covering onto a respective substrate. The adhesive layer is destroyed and needs to be replaced when an existing covering is removed and a new covering is installed. The covering is also normally destroyed and replaced with a new one. This removal and replacement does not normally occur in the case of paint. Where paint is used as a covering, the existing paint covering simply has one or more additional layers of paint applied on top of the existing paint. This is not the usual case for other types of floor or wall coverings although does occur in some situations. For example, wallpaper can have another layer adhered overtop of an existing one but this is not considered to be the best approach. The better practice, albeit more costly and difficult, is to strip out the old wallpaper and adhesive layer then apply a fresh adhesive with the new wallpaper. Non-permanent adhesives are generally not very effective for use with carpets and other floor or wall coverings inasmuch as they tend to degrade over time and/or with repeated use.

For installations of wall-to-wall carpet, it is often preferable to glue the carpet down, especially for large area installations. For installations of vinyl tiles, as is the case for most types of tile flooring, whether flexible or rigid types, it is generally considered a requirement that the tiles must be bound to the substrate using an adhesive. Due to the large areas often involved, such adhesives need to be cost-effective on an installed cost per unit area calculation basis. Where an adhesive layer needs to be replaced, the costs are not normally considered to be prohibitive. Magnetic adhesion systems for attaching wall and floor coverings to respective wall and floor substrates have gained limited market acceptance in recent years. They tend to be rather costly as compared to traditional adhesives. However, the benefit of being able to remove, reposition and/or replace the coverings without damaging them, the substrate or the magnetically attractive layer of the substrate has been shown to be of considerable benefit.

SUMMARY OF THE INVENTION

A liquid adhesive coating composition that cures into a solid form, used to non-permanently adhere interior floor or wall coverings to substrate floor or wall surfaces respectively, comprises a polymer incorporating iron or other paramagnetic, superparamagnetic, ferromagnetic or ferrimagnetic ingredients, that becomes permanently adhered to the substrate as it cures, and thereafter provides a low-tack adhesive surface that is also magnetically attractive, upon which magnetized floor or wall coverings including certain types of carpet, linoleum, vinyl, wallpaper and other types of magnetically-backed coverings can be subsequently installed. The combined low-tack adhesive and magnetic attraction qualities of the cured composition of the invention allow for said magnetically-backed floor or wall coverings to be sufficiently well adhered to the surface of said cured adhesive composition, to remain in place during normal usage while retaining the ability for said coverings to be subsequently removed, repositioned or replaced without damaging the respective coverings, cured adhesive coating composition or substrate.

The combined magnetic attractiveness and low-tack adhesive effects of the repositionable floor or wall coverings installed upon the respective substrates coated with the composition of the present invention can be varied by varying either or both the magnetic attractiveness and the non-permanent chemical adhesive aspects, as further described in the detailed description herein.

The composition of the invention includes embodiments in which the adhesive compound cures in the form of elastomeric foam, with the foam created by means of a secondary chemical reaction as the composition cures from a liquid into solid form. Said elastomeric foam also has combined magnetic attractiveness and low-tack adhesive qualities with additional cushioning and sound abatement qualities.

The composition of the invention includes embodiments in which the adhesive composition cures at ambient temperatures or at elevated temperatures.

Exemplary embodiments include adhesive compounds that are applied to substrate floors or walls as liquids as well as adhesive compounds that can be manufactured in roll or sheet form, laid onto the substrate floor or walls and subsequently heated to bind them to the respective substrates.

DETAILED DESCRIPTION OF THE INVENTION

Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The prior art is replete with elastomeric adhesives including silicones, latex and other types of rubber-based ones, elastomeric polyurethanes, etcetera. Attempting to fully list or describe numerous suitable ones that can be usefully combined with magnetic and/or magnetizable particles in any amount of detail would be a rather cumbersome and exhaustive undertaking. The preferred approach taken here to make it a more manageable task is to narrow down to the currently most preferred ones by focusing on some preferred attributes.

At its broadest, the composition of the invention comprises a polymeric adhesive with magnetic and/or magnetizable particles dispersed throughout that permanently adheres to a substrate as the adhesive cures into a solid form.

The cured composition has relatively high elasticity and the exposed surface of the cured composition has a low-tack adhesive quality.

Exemplary elastomeric adhesive coating compositions of the present invention can be of a single component or of a two component configuration (which can also be referred to as a two part configuration or two part composition) with the magnetic and/or magnetizable particles incorporated into one or both of the components or, in the alternative, able to be added in the field and mixed into one of the components prior to mixing in the other component or, in the further alternative, able to be added in the field and mixed in after the two components have first been mixed together.

Exemplary embodiments of the elastomeric adhesive coating composition have low enough viscosity in both of the respective components such that a maximum amount of magnetic and/or magnetizable particles can be incorporated into the composition of the present invention while keeping the effort required to mix the components together to a minimum, below about 250 cPs dynamic viscosity at about 25 degrees Celsius or about 77 degrees Fahrenheit (prior to adding magnetic and/or magnetizable particles). Mixing in of the magnetic and/or magnetizable particles can be carried out using simple hand tools such as a stirring stick or an electric drill with a mixing paddle. It is not and should not be necessary to use industrial paint shakers or other bulky or costly equipment to mix the composition in a field application.

Exemplary embodiments of the composition are not dependent on atmospheric moisture for curing although moisture cured adhesives can be used within the scope of the present invention. Exemplary embodiments of the invention also include liquid or solid single component adhesives with magnetic and/or magnetizable particles incorporated into the adhesive. While single part solvent-based, latex and acrylic liquid compositions are less desirable than two component liquid compositions notwithstanding the convenience of not having to mix two component compositions in the correct proportions, such adhesives are still within the scope of the present invention.

Exemplary embodiments include non-liquid or solid adhesive compounds that are adhesive compounds with magnetic and/or magnetizable particles incorporated into the adhesive that can be manufactured in solid form such as rolls or sheets, laid onto the substrate floor or walls and subsequently heated or pressed to bind them to the respective substrate floors or walls. Such adhesives can be hot-melt type adhesives or have a pressure-sensitive adhesive aspect respectively. Hot-melt adhesives are solid and have good strength at temperatures below about 50 degrees Celsius (about 120 degrees Fahrenheit) and typically melt at temperatures above about 200 degrees Celsius (about 400 degrees Fahrenheit). Such adhesives begin to re-solidify at temperatures below about 150 degrees Celsius (about 300 degrees Fahrenheit).

Moisture-cure, single-component adhesives are generally slow curing and have no mechanism for controlling the cure rate during the application process. The cure rate is also dependent on ambient temperature and humidity. Air dry adhesives usually contain solvents to control the cure process. Thus, for such air dry adhesives, the cure rate is dependent on temperature and humidity. While two-component adhesives are contemplated as the preferred adhesive component of the present invention, single-component adhesives, including those discussed above, are intended to be covered by the present invention, with the two-components of the adhesive described in detail below being substituted with the single-component adhesive.

Elimination of solvents that are generally considered undesirable, especially in the case of indoor applications, is becoming a more important consideration for environmental reasons. Latex, vinyl and acrylic adhesives are quite popular although, once cured, tend to have poorer longevity and less resistance to moisture than the exemplary two component systems. The magnetic and/or magnetizable particles can be either pre-mixed into these components or mixed into the compositions in the field.

Minimizing costs is a key motivator, as is normal for commercial products being brought to market. Conversely, maximizing storage or shelf life of the unmixed components to at least one year, preferably to ten years or longer is advantageous. The unmixed components of the exemplary embodiments of the present invention are expected to have long storage or shelf life.

Another motivator is to move toward using renewable ingredients and have the compositions able to be produced in the most sustainable manner possible. There are benefits such as LEEDS™ certifications which have become important in recent years for residential and commercial building projects.

An open time, working time or pot life, defined as the time after mixing within which the mixed composition can be applied before the composition has cured to the extent that the composition is no longer workable, is typically in the range of 10 to 30 minutes with full cure (to at least about 90% of final hardness) within about 24 hours. The exemplary embodiments of the invention can optionally include the use of curing additives that are used to set the cure rate, both the open time and the time to full cure.

The packaged quantities can be kept in the range of 2 to 15 liters (0.5 to 4 U.S. Gallons) mixed quantity for each packaged two part "unit", with the unit weight, including the magnetic and/or magnetizable particles, kept below the maximum weight a person can safely handle for all manual applications, less than 45 kg (100 pounds). This maximum weight includes the addition of the magnetic and/or magnetizable particles. A notable exception would be in the case of large spray application systems in which the components can also be packaged in large quantities.

Two-component urethane (polyurethane) adhesives are well known and are widely used as structural adhesives. Polyurethane adhesives, in general, as compared to other classes of adhesives, are often chosen based on their outstanding flexibility, bond strength, shock and impact resistance, durability, chemical inertness and other desirable properties. Such adhesives are usually comprised of two components, with one component comprising an isocyanate-terminated compound having at least two reactive isocyanate groups, and a second component comprising a hydroxyl-terminated compound having at least two reactive hydroxyl groups.

The vast majority of prior art adhesives, including these above described adhesives, are permanent adhesives, which means that once applied and cured, the adhesives are not able to be reused. Attempts to reposition articles adhered with permanent adhesives normally result in damage to or destruction of the adhesive and often the articles being adhered to.

Pressure-sensitive adhesives are adhesives that bond when pressure is applied to marry the adhesive with the adhered. No solvent, water or heat is needed to activate the adhesive. Most pressure-sensitive adhesives are also of the permanent type, although this class of adhesives includes many non-permanent adhesives that maintain their adhesive qualities sufficiently well that articles such as adhesive tape strips can be re-applied or repositioned. Such non-permanent or repositionable adhesives form a relatively small subset of the general category of adhesives.

Some adhesives are intended to exhibit different adhesive qualities at different times. For instance, it is known in the art that certain compositions can be partially cured at room temperature under atmospheric conditions in a rapid fashion to give a partially cured composition within a few minutes, which exhibits properties similar to those of pressure-sensitive adhesives having excellent tack, shear and peel strengths. Development of full strength occurs over a longer time frame in such adhesives. Where a composition comprising a blocked isocyanate prepolymer obtained by the reaction of a poly(alkylene oxide) polyol and a diol or triol with a diisocyanate in equivalent ratio of two isocyanate groups per hydroxyl group followed by capping the remaining isocyanate groups with phenolic blocking agents such as phenol is mixed with a polyamine, a flexible structural adhesive composition is obtained which exhibits a long open time with excellent tack and peel strength prior to full gelation or cure.

An exemplary pressure-sensitive adhesive comprises the reaction product of at least one alkyl acrylate liquid polymer containing both terminal and random hydroxyl functionality, and at least one prepolymer of a polyester glycol or a polyalkylene ether glycol with an excess amount of an aromatic diisocyanate. Such an adhesive has desirable properties including excellent rolling ball tack, peel adhesion and shear adhesion. However, such adhesives tend to be permanent adhesives.

Repositionable or non-permanent adhesives of interest include exemplary adhesives that comprise tacky, elastomeric copolymer hollow or solid microspheres and macromonomer-containing binder copolymers. These adhesives may further comprise at least one acrylate ester. These microsphere-type repositionable adhesives tend to be rather costly compared to other pressure-sensitive adhesives known in the art.

Combining magnetic and/or magnetizable particles with any such adhesive yields interesting and useful embodiments of the present invention, although there are other embodiments, which also tend to be less costly, prepared from two component polyurethane adhesives that have more of the preferred attributes described earlier in this description. Specific examples of exemplary embodiments of the invention are provided below in terms of, among other things, chemical composition, desirable and/or favorable attributes and relevant properties.

Example 1

In a two-part combination, low-tack polyurethane adhesive coating compound of the invention, a first component of the inventive adhesive is a polymerizable isocyanate, which includes any isocyanate that is known in the polyurethane art to polymerize with hydroxyl-containing compounds. An exemplary isocyanate is one containing 4,4'-diphenylmethane diisocyanate (MDI) alone or in combination with its 2,2'-isomer, 2,-4'-isomer and/or, polymethane polyphenyl isocyanate. In an exemplary embodiment, the MDI comprises between about 30% and about 60% by weight of the combination. The product currently made by Dow Chemical called PAPI-27™ is an exemplary polymerizable isocyanate. This isocyanate combination is often referred to in the art as "polymeric MDI". It is also commonly classified as an aromatic type, in contrast with various ones of an aliphatic type known in the art that are normally more costly but have some desirable properties such as being much less likely to change color when exposed to ultra-violet radiation.

A second component of this two-part combination, low-tack polyurethane adhesive coating compound comprises a certain class of polyols known as glycerides or acylglycerols, which are esters formed between glycerol and one or more fatty acids. Glycerides are generally found in plant oils and animal fats. glycerides can also, in some cases, be produced synthetically from a range of starting materials. In exemplary embodiments, the glycerides are vegetable oils. In further exemplary embodiments, the glycerides are castor oil. Castor oil, a natural and renewable product, is a fatty acid triglyceride which on average contains 2.7 secondary OH-groups per molecule, the fatty acid being primarily ricinoleic acid. This polyol or glyceride, which includes some preferred modifications as will be described in detail below, will be referred to herein as "modified castor oil".

The Example 1 mixture of the first component and the second component, prior to the inclusion of the magnetic and/or magnetizable particles, where the first component is the polymeric MDI described above and the second component is modified castor oil described above and in subsequent paragraphs, is in the ratio second component:first component of 70:30 parts by weight or 3:1 parts by volume. This is a purposely derived set of ratios because round number ratios are more easily measured in the field, especially by volume, than are fractional ratios. Standard mixing pails used in the coating and painting trades often come with pre-printed markings showing, for example, 1:1, 2:1, 3:1 and 4:1 volumetric ratios.

The 3:1 volumetric ratio is a preferred one since there is enough liquid volume in the second component (modified castor oil in this Example 1) to accommodate a substantial amount of the magnetic and/or magnetizable particles (as will be described in detail in a later part of this description) in the mixture where these particles are either pre-blended into the second component at the factory, mixed into the second component in the field or mixed into the mixture of the first and second components. There can however be a wide range of ratios, ranging practically from 1:1 to 4:1 (volumetric) and they do not need to be in round number or integer increments, notwithstanding the stated preferences. Pre-polymerizing some of the castor oil or other ingredients into the first component, including adding varying amounts of active or passive ingredients to either the first or second component or to both components are among techniques that can be used to adjust two component formulations to meet a specific volumetric and/or gravimetric ratio of the components. There are many methods known in the art since many two component formulations need to be designed to a specific ratio to match to equipment designs that are normally set in specific volumetric ratios, the most common ratios being 1:1, 1.5:1, 2:1, 3:1 and 4:1 parts by volume or PBV.

The magnetic and/or magnetizable particles used in the composition of the invention are preferably added to the castor oil component in Example 1 for a number of reasons. Firstly, it is considered good practice to not add anything to the isocyanate component since it much more reactive than the castor oil component and easily contaminated. The isocyanate component is normally packaged with a nitrogen blanket in a sealed container, said non-reactive nitrogen displacing any atmospheric moisture or oxygen. Secondly, the castor oil component, being mainly oil, is easier to mix the magnetic and/or magnetizable particles into and creates a smoother and more easily stirred mixture. Engineering the composition with the relatively large oil component makes it relatively easy to get all of the needed magnetic and/or magnetizable particles mixed into the adhesive coating compound of the invention without increasing the viscosity too much. Thirdly, mixing the magnetic and/or magnetizable particles into the second component does not initiate any chemical reactions. This is beneficial in that one can take as much time as needed to mix in the magnetic and/or magnetizable particles until they are well dispersed without using up any of the working time (pot life). If the magnetic and/or magnetizable particles are subsequently added to the mixture of the first and second components, the time taken to get the magnetic and/or magnetizable particles mixed and disbursed reduces the remaining working time accordingly inasmuch as the mixture of the first and second components begins reacting immediately as they come into contact with each other. It takes relatively little time for mixing the first component in after the magnetic and/or magnetizable particles are already dispersed into the second component.

The pricing and availability of castor oil has historically proven to be rather volatile. Therefore, ring-opening products of epoxidized fatty acid esters with aliphatic alcohols having a functionality from 1 to 10 can be used. Renewable starting materials include: epoxidized soybean oil having an epoxide number from 5.8 to 6.5, epoxidized sunflower seed oil having an epoxide number from 5.6 to 6.6, epoxidized linseed oil having an epoxide number from 8.2 to 8.6 and epoxidized train oil having an epoxide number from 6.3 to 6.7. The epoxidized triglycerides may be subjected to complete ring opening with polyhydric or monohydric alcohols or even to partial ring opening. Partial ring opening results in the formation of modified triglycerides containing on average epoxide and hydroxyl groups and also other groups. This sub-group of ring-opening products of epoxidized triglycerides comprises compounds which are readily available and can be produced in a wide range of variation.

Various epoxidized triglycerides of agricultural origin, in other words, from vegetable or animal origin, may be used as starting materials for producing the ring-opening products, with the main requirement being that a substantial portion of epoxide groups should be present. For example, epoxidized triglycerides containing between about 2% and about 10% by weight of epoxide oxygen are suitable. Products having an epoxide oxygen content between about 3% and about 5% by weight are particularly suitable for certain applications. This epoxide oxygen content may be adjusted by starting out from triglycerides having a relatively low iodine number and subjecting them to thorough epoxidation or by starting out from triglycerides having a high iodine number and only partly reacting them to form epoxides.

Another group of products suitable for adhesive applications is based on epoxidized triglycerides having an epoxide oxygen content between about 4% and about 8.5%. Products such as these can also be produced from the following fats and oils (in order of increasing initial iodine number): beef tallow, palm oil, lard, castor oil, peanut oil, rapeseed oil and cottonseed oil.

Starting with raw castor oil, often classified in the art as No. 1 crude, some relatively simple modifications are made to the raw oil, sometimes after any remaining solids are filtered out, to produce a particularly preferred embodiment of the present invention. Such modifications can include the optional addition of pigments in the amount of about 2% by weight such as titanium dioxide (white) and black iron oxide. The black iron oxide also has magnetic properties although at an insignificant level given such small quantities as this 2%. The oil needs to be free of moisture which can be achieved by heating to drive off the excess moisture, adding a dessicant, an example one being synthetic zeolite, in the amount of about 1% by weight, or both, heating followed by such an addition.

In certain exemplary embodiments, a blowing or foaming agent may be incorporated. These blowing or foaming agents react with the isocyanate to produce carbon dioxide. A small amount of water can be added, or an alcohol. Various blowing agents can be used alone or in combination to produce different qualities and amounts of foaming while curing. Cell size and structure (closed cell, open cell, size distribution, etc.) can be thus influenced.

Surfactants and/or emulsifiers can also be used to modify the castor oil. Plasticizers such as plasticizing oils can be optionally added. Solvents can also be employed. Electrically conductive material can be added, notwithstanding that various among the preferred magnetic and/or magnetizable particles are electrically conductive. Metallic and/or non-metallic flakes can be added for visual effects. Materials to resist the effects of ultra-violet radiation and anti-oxidants can also be incorporated.

Further materials such as abrasives, carbonates or boron components or other fire resistance enhancing additives can be included. Additives for higher absorption resistance, strength-enhancing cellulose or glass fiber can also be used as can various fillers. Toxins and anti-bacterial additives can be added to prevent bacterial growth or other forms of fouling.

Although the Example 1 composition of the invention will cure at ambient temperature to at least about 90% of final hardness within about 24 to 36 hours, in an exemplary embodiment, an accelerator can be added to the composition to speed curing in various instances. These accelerators include tertiary amines, for example dimethylethanolamine (DMEA), or an organometallic compound, for example, dibutyltindilaurate (DBTL) or dioctyltindilaurate (DOTL). Various accelerators can be used alone or in combination to effect different cure rates at different parts of the curing cycle. Such accelerators can also be selected to bias or preferentially cure different aspects at different rates. For example, there are ones that will speed the primary curing while not speeding up the secondary foaming reaction, or vice versa.

Exemplary magnetic and/or magnetizable particles are selected from paramagnetic, superparamagnetic, ferromagnetic and/or ferrimagnetic substances, in particular selected from the group consisting of iron, cobalt, nickel, gadolinium, dysprosium, iron-nickel alloy (permalloy), iron (II, III) oxide (magnetite), iron (III) oxide (hematite), ferrosilicon, mixed iron oxides, mixed iron oxides with other metal oxides from the transition elements group like iron-nickel oxides, and combinations thereof.

The magnetic or magnetizable particles are granular or in the form of powders, flakes or filings or combinations thereof. The preferred particles are granular or in the form of powders and have an average diameter of between about 100 nm to 1000 micrometers, in particular between about 1 micrometer and about 350 micrometers. A lower threshold diameter of greater than about 100 nm is selected due to viscosity limitations, improved magnetic properties and, currently, cost considerations.

Particles smaller than 100 nm tend to increase viscosity too quickly such that it becomes difficult to mix in enough of them to achieve sufficient density of magnetic and/or magnetizable particles in a cured adhesive coating composition of the invention to meet the minimum magnetic attractiveness requirements for floor or wall coverings. It is also well known that for many magnetic and/or magnetizable materials, coarser particles with larger grain size generally provide for increased magnetic permeability, an advantage of using larger particle sizes. Costs currently also tend to decrease for larger particle sizes although this trend may be changing.

Exemplary magnetic or magnetizable particles comprise either steel or iron with the iron content as high as about 99% by weight such as the steel and iron powders used in powdered metallurgy and powder forging applications. These particles, however, are quite prone to rust corrosion notwithstanding the ability of the polymer composition of this invention within which they are dispersed to encapsulate them.

For certain applications, particularly where high or potentially high levels of moisture are of concern, magnetic and/or magnetizable particles comprised of steel or iron particles encapsulated in a silica or other corrosion resistant coating comprising a minimum of about 80% iron by weight can be used, notwithstanding a normally higher associated cost compared to powdered or granular iron or steel.

Magnetic ferrosilicon is somewhat corrosion resistant. Magnetic ferrosilicon is normally produced in arc furnaces and typical grades contain between about 15% and about 50% silicon. The silicon inhibits the oxidation of the iron such that the particles will not rust. An alternative form of magnetic ferrosilicon is a type that has been atomized into a more spherical form than conventional crushed and graded versions. This atomized version tends to mix more readily in the polymers. It can be beneficial to keep the iron content of the ferrosilicon relatively high, with a specific preferred grade comprising about 85% iron (about 15% silicon).

When using these above exemplary iron-based magnetic and/or magnetizable particles, the polymer typically comprises about ¼ to ½ of the total weight of the composition while iron-based magnetic and/or magnetizable particles represent the balance ½ to ¾ of the weight of the composition of the invention. In the Example 1 embodiment, the iron-based magnetic and/or magnetizable particles comprise iron and/or the 85% iron grade of ferrosilicon and represents about ⅔ of the weight of the composition.

The composition of the invention provides an adhesive floor or wall surface that has an adhesive effect that is a combination of a magnetic attractiveness superimposed upon or combined with a low-tack adhesive effect with a surprisingly enhanced shear-resistance adhesive effect in the horizontal plane in the case of flooring and in the vertical plane in the case of vertical surfaces such as walls. The tensile adhesion in the case of floors is a measurement of a vertical pulling force. Although the following description is based on measurements made in the case of floor applications, the description also applies to walls.

A method of determining vertical (tensile) adhesion for flooring is carried out by measuring the force per unit area required to vertically pull (to separate) a magnetic floor covering from the cured surface of the composition of the present invention. It is a measurement commonly known in the coatings or coverings art as a measure of pull-off strength. To determine horizontal (shear) adhesion for floor coverings in the case of the invention, the force per unit area required to horizontally pull (until there is a visible horizontal shift or movement) a magnetic floor covering from a cured surface coating comprising the adhesive composition of the present invention is measured. The shear measurement is especially important for flexible floor coverings. Carpets, tiles, rolled vinyl, etc. tend to shift and wrinkle, bunch, pop-up and overlap or otherwise move in undesirable ways if insufficient shear adhesion is present. Although pull-off strengths are often measured and compared, shear strengths can be a generally more important, albeit less commonly measured property. For an extreme example illustrating the importance of high shear strengths relative to pull-off strengths, a fork lift carrying a load has much less tendency to lift a floor covering than it does to cause it to shift horizontally when applying the brakes or accelerating quickly. A less dramatic but more common problem is that under high levels of foot traffic, carpets can shift horizontally in tiny increments with each passing person. Those cumulative shifts can result in relatively large horizontal movements. Carpets are often pre-stretched and fastened tightly at the edges when being installed to cause them to remain oriented so that any such tiny incremental shifts caused by foot traffic or otherwise, relapse after each passing person or other movement. Where there is relatively high resistance to shear, as is the case when floor coverings are used with various embodiments of the adhesive coating composition of the present invention, there is less or no need to pre-stretch the floor coverings.

For the tensile pull-off strength test, a 2 inch by 2 inch (50.8 mm×50.8 mm) square piece of magnetic floor tile can be used. For the shear test, an 18 inch by 18 inch (457 mm×457 mm) square piece of magnetic floor tile can be used. The floor tile for this test comprises a sample of the increasingly widely used type of flexible floor tile commonly known as "LVT" or "luxury vinyl tile" that has a magnetic backing. This 2 inch by 2 inch piece of magnetically-backed LVT has a 15 g mass, exerting about 0.15 Newtons (about 0.03 pounds-force) downwards due to its mass. The larger 18 inch by 18 inch square magnetically-backed LVT has a 1.42 kg mass, exerting about 14N (about 3 pounds-force) downward due to its mass. The LVT are each about 3 mm (0.125 inch or ⅛ inch) thick.

Tensile and shear measurements made on various embodiments of the composition of the present invention can be compared to cured epoxy, polyurea, polyurethane, polyaspartic and/or other coatings that do not have any adhesive tack.

Comparative Example

A polyaspartic (polyurea) two part aspartate-ester polyurea (AE-PUREA) composition was used to create a comparative example (non-tack) composition, hereinafter referred to as "Comparative Example", containing magnetic and/or magnetizable particles comprised of Ferrosilicon Cyclone 60 Atomized Ferrosilicon 15%, containing about 85% iron, available from M&M Alloys, with the ratio of Part A to Part B in said AE-PUREA being 1.35:1 parts by volume or 100:79 parts by weight with a typical batch comprising about 4.5 kg (about 10 pounds) of the ferrosilicon mixed into about 2.35 liters of the AE-PUREA. A reference tack-free magnetic and/or magnetizable floor coating of the prior art is prepared by curing this Comparative Example composition in a thickness of about 0.5 mm (0.020 inches). This cured Comparative Example composition has a final hardness greater than about Shore D55.

Example 2

An alternative embodiment of a magnetic and/or magnetizable adhesive coating composition of the present invention, which is a more narrowly specified example embodiment of Example 1 and hereinafter referred to as Example 2, comprises a mixture of 177 parts by weight magnetic and/or magnetizable particles in the form of atomized ferrosilicon, containing about 85% iron, the same as that used in the Comparative Example; 70 parts by weight modified castor oil; and 30 parts by weight polymeric MDI is cured in a thickness of about 0.5 mm (about 0.020 inches). This cured Example 2 composition has a final hardness less than about Shore D45.

Vertical tensile and horizontal shear tests performed on this Example 2 cured composition are compared to the same tests performed on the Comparative Example cured composition. The test results reveal shear enhancements that are disproportionately high in comparison to the vertical tensile pull-off test results. The type and amount of magnetic and/or magnetizable particles, as well as the particle density per unit area, were approximately the same for both.

Some vertical pull-off test results are approximately 120 g (about 1.2 Newtons or about 0.26 pounds-force) for the Example 2 embodiment and about 90 g (about 0.9N or about 0.2 pounds) for the Comparative Example (in both cases measured at 5 minutes). The Example 2 vertical pull-test result was calculated and found to be 33% higher than the result for the Comparative Example. The difference in vertical pull-test result is due to the additional low-tack adhesion since the magnetic attractiveness is approximately the same in both.

For additional comparison, the Comparative Example and Example 2, when installed without the inclusion of magnetic and/or magnetizable particles, gave tensile pull-off strength test results of 0 g (0 Newtons or 0 pounds-force) and 20 g (about 0.2 Newtons or about 0.05 pounds-force) respectively. The difference is entirely due to the adhesive tack properties of Example 2 that are completely lacking in the Comparative Example.

The horizontal shear test results are approximately 10 kg (about 98 Newtons or about 22 pounds-force) for the Example 2 and about 7 kg (about 69 Newtons or about 15 pounds) for the Comparative Example respectively measured, at less than 30 seconds, resulting in a 50% difference. The horizontal shear tests were also conducted at 5 minutes to yield the results of about 15 kg (about 147 Newtons or about 33 pounds) for Example 2 and about 11 kg (about 108 Newtons or about 24 pounds) for the Comparative Example, a 40% difference. It is also noteworthy that the magnetic attractiveness increases over time due to the properties of magnetic materials. The magnetic materials tend to align magnetically when subjected to strong magnetic fields, thereby becoming more magnetically attractive.

While the low tack adhesive properties increase the tensile pull-off numbers about 30% to 40% over the non-tacky Comparative Example, the corresponding horizontal shear resistance numbers increase about 40% to 50%. Without intending or wanting to be bound to a particular theory, this unexpectedly disproportionately high shear testing result is a desirable one that appears to be caused by the magnetic attractive force holding the floor covering down to the adhesive compound of the invention and increasing the frictional resistance as part of that magnetic attractive force. It is likely due to the hardness of the preferred compositions of the invention (under Shore D45) being lower than that of the harder non-tacky Comparative Example magnetic coating compositions that seem to have in common higher hardness values (over Shore D50, more commonly about Shore D60 to Shore D85). The additional quality of the low-tack adhesive being a softer material appears to allow the floor covering to be pulled down and somehow 'dig in' to the cured adhesive more tightly as compared to harder prior art coating materials. This magnetic pulling effect also serves to keep dirt and other contaminants from getting under the coverings during normal use and fouling the system, thereby avoiding prematurely reducing or eliminating low-tack adhesive effect. As was mentioned earlier, low-tack adhesives generally do poorly with floor coverings since such adhesives are too easily contaminated and too easily lose their adhesive quality. The magnetic attractiveness is largely unaffected by dirt or other contaminants getting between the covering and magnetic adhesive coating layer. Additionally, the relative softness may be aiding the shear resistance by allowing localized imperfections (bumps or raised parts of the adhesive coating layer) to become slightly flattened and/or compressed, thereby increasing the actual physical contact area between the covering and adhesive coating layer more than that which occurs with harder, less-compressible, coatings. Even slight increases in contact area will allow the low-tack adhesive quality to become more effective.

For additional comparison, the Comparative Example and Example 2, when installed without the inclusion of magnetic and/or magnetizable particles, gave horizontal shear strength test results of 0 kg (0 Newtons or 0 pounds-force) and less than 2 kg (about 20 Newtons or about 5 pounds-force) respectively. The difference is entirely due to the adhesive tack properties of Example 2 that are completely lacking in the Comparative Example. It is interesting that the low-tack adhesive property in isolation (no magnetic attractiveness aspect) is somewhat smaller than expected. This appears to be consistent with the above theory that without the magnetic attractive force, the tile more easily separates or "pops" from the adhesive coating layer since there is no constant magnetic force increasing the friction between the LVT covering and adhesive coating layer during the test. The low-tack adhesive aspect does not perform nearly as well in isolation as it does when operating in conjunction with the magnetic attraction aspect. This was an unexpected result. It was expected that the two effects would be simply additive, not multiplied as the measurements reveal.

An approximately 2.5 liter mixture of the Example 2 embodiment as well as a similar amount of the Comparative Reference are easily able to have about 4.5 kg (about 10 pounds) respectively of either iron powder with median particle size in the range of about 1 to 100 micrometers (about 99% iron in the samples used with maximum particle size of about 250 micrometers) or the atomized ferrosilicon with median particle size smaller on average but still in the same range of about 1 to 100 micrometers (about 85% iron in the samples used with maximum particle size of about 150 micrometers) mixed in easily at ambient temperature. This can be done mechanically using a drill with mixing paddle, by other mechanical means, or by hand using a simple wooden, plastic or metal stir stick, needing no more than a few minutes of mixing time. Such amount at a coverage rate of about 6.5 square meters or about 70 square feet provides for an adhesive coating layer of about 0.5 mm (or about 0.020 inches or about 20 mils) thickness that has sufficient magnetic attractiveness between the floor covering and cured adhesive coating composition coated substrate floor or wall. A practical minimum threshold magnetic attractiveness using this above horizontal shear strength test procedure is at about 10 kg (about 98 Newtons or about 22 pounds-force), when tested at about 5 minutes after commencement of the test. Attempting to stir in a similar amount of magnetite iron oxide powder (Huntsman-Davis Colors—860 Synthetic Iron Oxide Black™) with predominant particle size of 0.20 micrometers or 200 nm was not successful because the viscosity increased too much, too soon. Only about half that amount or about 2.5 kg (about 5 pounds) was all that could be stirred in manually with ease at ambient temperature. This is generally found to be a less than satisfactory amount of the magnetic and/or magnetizable magnetite iron oxide particles because this concentration generally does not provide for enough magnetic attractiveness to keep the floor tiles in place. The horizontal shear test results were measured at about 5 kg (about 49 Newtons or about 11 pounds-force) in this case. However, manufacturing a sheet version of the adhesive composition of the invention using elevated temperatures and a mechanical mixing of high viscosity paste versions enables the inclusion of considerably more dry magnetic and/or magnetizable particles, such as the magnetite iron oxide particles being described here in this example, into the mixture. Similarly, the density of other magnetic and/or magnetizable particles within various compositions of the invention can be increased through such means.

Another feature of the invention is that both the combined total and the relative amounts of adhesion caused by the magnetic attractiveness and low-tack adhesive can be varied and adjusted to achieve a net effective adhesion that meets particular needs for particular applications, while optimizing the cost aspects. Varying the low-tack adhesion property is quite inexpensive since it can be done for example in the case of Example 2, by slightly increasing the ratio of the second component to the first component from approximately 70:30 parts by weight to 72:28, giving a slightly softer and tackier result. Going in the other direction by changing the ratio to 68:32 will yield a harder and less tacky result. The magnetic attractiveness aspect can be varied by increasing the amount of magnetic and/or magnetizable particles used in the composition by mixing more into the composition and/or increasing the installed thickness. Selecting magnetic and/or magnetizable materials with greater magnetic properties is another option, although generally a costly one. Increasing the relative amounts of magnetic materials or the quality of these materials tends to be costly. The magnetic attractiveness can also be increased by strengthening the magnetic properties of the magnetic backing of the carpet, tiles or other floor or wall coverings through one or more of various known means, also tending again to be more costly than tweaking the adhesive coating composition formulations.

Exemplary embodiments of the composition have good self-leveling properties where used in flooring applications and resistance to sagging where used in wall applications. The tack properties are low enough that persons installing floor coverings are able to walk on the surface of the cured composition without their footwear becoming sticky to the extent that such persons are not able to move about freely enough to install the floor coverings, without using spiked shoes or other specialized footwear.

An exemplary thickness for exemplary embodiments of the cured composition is approximately 0.50 mm (about 0.020 inches), with the range of thicknesses being between about 0.20 mm and about 8 mm (about 0.008 inches to about 0.30 inches). The good self-leveling properties in the case of flooring applications for exemplary embodiments of the composition allow the composition to fills cracks, voids, dips and low spots in imperfect floor substrates. The substrates can comprise but are not limited to concrete and/or other cementitious materials, wood, composite and metal materials.

Field trials with the Example 2 embodiment when compared to the Comparative Example showed improved filling of voids, etc. due to the better self-leveling properties associated with the Comparative Example embodiment. Low spots or voids are highly undesirable under LVT floor tiles and other floor coverings, as are bumps, raised areas and/or ridges. Such high spots are normally removed mechanically using grinders and/or other means known in the art. Usage where there are voids underneath floor coverings such as LVT causes the tiles to begin cracking and failing, especially in high traffic areas. This failure becomes a big problem in applications such as supermarket floors where various trolleys and other wheeled devices carrying loads are frequently employed. The wheels (as well as footwear heels) tend to quickly cause such depressions or voids under floor tiles to reveal themselves through deformation of the tiles. This deformation often causes tiles to fail. Removing any bumps ahead of applying the adhesive coating composition and allowing the adhesive composition of the present invention to flow into and fill any such voids prior to installing the floor coverings reduces or eliminates this problem. There is no limit as to the maximum thickness of the composition where there is such a void although they are typically no more than about 1 cm (½ inch) in depth. It is common practice to fill and level such floors beforehand, selecting from a large number of commonly available compounds although the composition of the present invention also satisfactorily performs this function.

Primers and/or sealers can be used in conjunction with the magnetic adhesive coating composition of the present invention. Such primers and/or sealers are normally installed and cured onto the substrate prior to applying the composition, although there are a few that do not need to be fully cured before applying the composition. Such primers and sealers are used to improve adhesion of the composition to the substrate and/or block excess moisture from migrating through the substrate and degrading the performance of the composition and/or coverings applied to the cured composition. Various embodiments of the invention can be formulated to have different water vapor transmission rates and moisture vapor permeability properties as needed for various applications. For instance, it may be desirable in some situations to have a high moisture vapor permeability to allow moisture to freely migrate and in others to completely seal the surface so that little or no moisture can migrate. It may also be desirable in some cases to formulate the composition to seal and prevent radon and/or other toxic gases from migrating.

Foaming the adhesive coating composition of the invention provides for sound and vibration dampening as well as greater cushioning under the floor or wall coverings. This can be important in areas such as auditoriums or hotels where acoustic properties play an important part. For instance, hotel hallways and rooms often use carpets rather than vinyl flooring so that there is less noise from footsteps and other sources of sounds and/or vibrations passing between floors and/or walls.

Liquid coatings such as paints, clear varnishes, or sealers can also be used on top of the composition although the low-tack adhesive effect becomes diminished if there is another coating used on top before the magnetically-backed floor or wall covering is installed. The magnetic attractiveness may also become reduced if the top coating is too thick, creating greater distance between the respective magnetically attracted surfaces.

There may be instances where there is a localized need for an increase in adhesive strength, such as at edges or corners in tile floors. Having the composition installed at greater thickness, thereby presenting a greater per unit area density of magnetic and/or magnetizable particles at the edges aids in this regard. This can also be achieved by applying some additional adhesive of a different type to the top of the cured composition before placing the magnetically-backed floor (or wall) covering. In cases where it is not desired to use a permanent adhesive for this, a suitable repositionable adhesive such as one marketed by 3M identified as Repositionable 75 Spray Adhesive™ may be used. This product is packaged in aerosol spray cans and comprises about 10% parts by weight of a synthetic elastomer with various solvents and propellants (acetone 30-40%, heptane isomers 20-30%, isobutene 20-30%, propane 7-13%). This product is easily spray-applied to the surface of the cured composition of the invention.

The composition of the present invention can also be used as part of the floor or wall covering itself, for example, applied and cured to the underside of a conventional (non-magnetically-backed) floor tile, either in a factory or in the field. Such a tile or covering could be magnetized using known methods while offering an improvement over prior art magnetically-backed tiles inasmuch as there is an additional low-tack adhesive property inherent in the adhesive coating composition. Such a low-tack, magnetic covering, when installed on a substrate that has a cured layer of the adhesive coating composition of the invention would in effect provide for an increase in the low-tack adhesive aspect due to the low-tack adhesive aspect from each respective surface coming into contact, adding or multiplying the shear adhesion strengths.

Specific examples of compositions, composition components, uses, systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments as described herein with features, elements and/or acts of other technology; and/or omitting combining features, elements and/or acts from described embodiments.

While the invention has been disclosed in its preferred form, the specific embodiments thereof as disclosed herein are not to be considered in a limiting sense, because numerous variations are possible. The subject matter of the invention includes all novel and non-obvious combinations and sub-combinations of the various elements, features, functions and/or properties disclosed herein. No single feature, function, elements or property of the disclosed embodiments is essential. The following claims define certain combinations and sub-combinations which are regarded as novel and non-obvious. Other combinations and sub-combinations of features, functions, elements and/or properties may be claimed through amendment of the present claims or presentation of new claims in this or a related application. Such claims are also regarded as included within the subject matter of the present invention irrespective of whether they are broader, narrower or equal in scope to the original claims. This invention also covers all embodiments and all applications which will be immediately comprehensible to the expert upon reading this application, on the basis of his or her knowledge and, optionally, simple routine tests. In addition, the various embodiments described above can be combined to provide further embodiments.

It is therefore intended that all claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A cured composition derived from a mixture comprising the following components:
   (a) a first component comprising a polymerisable isocyanate;
   (b) a second component comprising a castor oil; the ratio of the polymerisable isocyanate to the castor oil being between about 20% and about 45% by weight; and
   (c) magnetic and/or magnetizable particles mixed into at least one of the first component and the second component;
   wherein the magnetic and/or magnetizable particles is in the range of between about 30% and about 80% by weight of the total composition.

2. The composition as claimed in claim 1 wherein the castor oil has been modified by the inclusion of about 1% to 2% by weight of a pigment.

3. The composition as claimed in claim 1 wherein the castor oil has been modified by the inclusion of about 0.5% to 1% by weight of a dessicant.

4. The composition as claimed in claim 1 wherein the castor oil has been modified by the inclusion of about 0.01% to 1% by weight of a foaming agent.

5. The composition as claimed in claim 1 wherein the castor oil has been modified by the inclusion of at least one of an emulsifier and a surfactant.

6. The composition as claimed in claim 1 wherein the magnetic and/or magnetizable particles are added to the resultant mixture of the first component and the second component while the resultant mixture of the first component and the second component is still in a liquid state.

7. The composition as claimed in claim 1 wherein the magnetic and/or magnetizable particles are added to the second component prior to mixing the resultant mixture with the first component.

8. The composition as claimed in claim 1 wherein the magnetic and/or magnetizable particles are granular or in the form of powders, flakes or filings or combinations thereof.

9. The composition as claimed in claim 8 wherein the magnetic and/or magnetizable particles are granular or in the form of powders, and have an average diameter between about 10 nm and about 500 micrometers.

10. The composition as claimed in claim 9 wherein the magnetic and/or magnetizable particles have an average diameter greater than 100 nm and less than about 500 micrometers.

11. The composition as claim in claim 1 wherein the magnetic and/or magnetizable particles comprise iron.

12. The composition as claimed in claim 1 wherein the magnetic and/or magnetizable particles comprise iron and/or ferrosilicon having a minimum of about 80% overall iron content by weight.

13. The composition as claimed in claim 1 wherein the magnetic and/or magnetizable particles comprise steel or iron particles encapsulated in corrosion resistant coating comprising a minimum of about 80% iron by weight.

14. The composition as claimed in claim 1 wherein the magnetic and/or magnetizable particles are selected from the group consisting of paramagnetic, superparamagnetic, ferromagnetic and/or ferrimagnetic substances.

15. The composition as claimed in claim 14 wherein the particles are selected from the group consisting of iron, cobalt, nickel, gadolinium, dysprosium, iron-nickel alloy (permalloy), iron (II,III) oxide (magnetite), iron (III) oxide (hematite), ferrosilicon, mixed iron oxides, mixed iron oxides with other metal oxides from the transition elements group including iron-nickel oxides, and combinations thereof.

16. An article of manufacture comprising a cured composition derived from a mixture comprising the following components:
    a. a first component comprising between about 5% and about 20% by weight of a polymerisable isocyanate; and
    b. a second component comprising magnetic and/or magnetizable particles and a castor oil, the magnetic and/or magnetizable particles being present in the range of between about 50% and about 90% by weight in the second component, the balance being the castor oil.

17. The article as claimed in claim 16 wherein the article is in form of an elastomeric adhesive.

18. The article as claimed in claim 16 wherein the article is in the form of a floor or wall covering.

19. The article as claimed in claim 16 wherein the article is in the form of a permanent adhesive coating.

20. The article as claimed in claim 16 wherein the article is in the form of a non-permanent adhesive coating that is permanently bound to a substrate.

21. The article as claimed in claim 16 wherein the composition comprises:
    about 177 parts by weight magnetic and/or magnetizable particles;
    about 69 parts by weight castor oil; and
    about 30 parts by weight isocyanate;
    and further comprising about 1 part by weight zeolite.

22. The article as claimed in claim 21 wherein the magnetic and/or magnetizable particles comprise iron and/or 85% iron-containing ferrosilicon.

* * * * *